3,153,081
PROCESS FOR PREPARING PHENYL PHOSPHORODICHLORIDATES
Francis X. Markley, Bound Brook, N.J., and Calvin J. Worrel, Detroit, Mich., assignors to Ethyl Corporation, New York, N.Y., a corporation of Virginia
No Drawing. Filed Oct. 26, 1962, Ser. No. 233,435
7 Claims. (Cl. 260—461)

This invention relates to, and has as its principal object, the preparation of phenyl phosphorodichloridates.

This application is a continuation-in-part of S.N. 730,265, filed April 23, 1958, now abandoned.

Phenyl phosphorodichloridates are very useful chemical intermediates in the synthesis of phenyl dimethyl phosphates. Many of the latter compounds are exceptionally effective ignition control compounds when blended in small quantity with leaded gasoline.

The preparation of aryl phosphorodichloridates has heretofore been exceedingly difficult. It has been pointed out, and the art appreciates, that reactions between phenols and phosphoryl chloride require heating, usually at reflux point, and that under these drastic conditions the restriction to monosubstitution is not very effective, even with excess phosphoryl chloride. It has thus been pointed out and shown in the prior art that the yields of monoaryl derivatives, as a rule, are decidedly short of theory.

A simple and highly efficient low-temperature process has now been discovered which enables the preparation of phenyl phosphorodichloridates in very high yield.

Provided by this invention is a process of preparing phenyl phosphorodichloridates characterized by heating a monohydric phenol containing up to about 8 carbon atoms and up to 1 chlorine atom attached to the ring with phosphoryl chloride in mole ratio of from 1 to about 2 moles of the chloride per mole of the phenol at a temperature of about 85 to about 130° C. in the presence of a small amount of an active aluminum catalyst—viz, aluminum chloride or metallic aluminum which has been rendered highly active by refluxing the same with phosphoryl chloride for at least 0.5 hour.

A preferred embodiment, because of the fact that maximum yields of the desired product are obtained thereby, is the process described above further characterized in that the phenol is introduced in incremental portions into a mixture of the chloride and the catalyst, and the temperature of the resultant reaction mixture is maintained between about 85 and about 110° C. until at least about one-half of the phenol has been so introduced.

A striking feature of this invention is the exceedingly high yields of phenyl phosphorodichloridates that are achieved. Thus, even though reaction temperatures well below the reflux point are used, the difficulties referred to in the prior art are not encountered. This is significant because in the reaction under consideration, it would be expected that a mixture of phenyl phosphorodichloridates, diphenyl phosphorochloridates and triphenyl phosphates would be formed. Instead, however, restriction to mono substitution—i.e., monophosphorylation—has been accomplished to a very great extent as will be seen from the ensuing description.

Another feature of this invention is that the catalysts are highly specific. For example, whereas m-cresol and phosphoryl chloride must be heated above 200° C. for 5 to 6 hours to obtain m-tolyl phosphorodichloridate, the presence in the same reaction mixture of as little as one mole percent of aluminum chloride, based on the phenol, made it possible to complete the reaction in 40 to 50 minutes at 105° C. In sharp contrast to this, magnesium and zinc dust, magnesium and zinc chlorides, phosphorus trichloride and the highly-acidic protonated acids—trichloroacetic and p-toluene sulfonic acids—have been investigated as possible catalysts in this reaction. Of these, only magnesium chloride and phosphorus trichloride gave some evidence of accelerated reaction rates. With magnesium chloride, however, two mole percent of catalyst required three hours at 90° C. to give 95 percent of the theoretical amount of hydrogen chloride as compared with 40 to 50 minutes for aluminum chloride. Moreover, the yield of the phosphorodichloridate was significantly higher when aluminum chloride was used as the catalyst. Therefore, while a few other materials are operable as catalysts, they are far less satisfactory than the selective catalysts of this invention.

Still another feature of this invention is the fact that the selective catalysts make possible the preparation of phenyl phosphorodichloridates in very short reaction periods. Kinetic studies have shown that the reaction is virtually instantaneous when the catalysts of this invention are used. Thus, the reaction can be carried out as fast as the hydrogen chloride can be removed from the reaction zone. In small-scale operations the reaction time is normally less than one hour. On the other hand, when the process of this invention is conducted on a very large scale, the reaction times are usually no longer than three hours, the time required to remove hydrogen chloride from large-scale reaction equipment.

The following examples illustrate this invention. All parts and percentages are by weight.

EXAMPLE I

A mixture of 1.33 parts (0.01 mole) of aluminum chloride in 206.6 parts (2 moles) of phosphoryl chloride was heated to 90–95° C. and 108 parts (1 mole) of m-cresol was added dropwise with stirring over a period of 25 minutes. The temperature was allowed to rise rapidly to 100–105° C. Phosphoryl chloride carried past the reflux condenser by the evolution of hydrogen chloride was collected in two cold traps (−70° C.). The hydrogen chloride was absorbed in water and titrated with standard sodium hydroxide to determine the end of the reaction. Then excess phosphoryl chloride was distilled off at 35–60° C., initially at 100 millimeters and finally at 1 millimeter. The dichloridate and monochloridate were fractionated at 1 millimeter in a 12-inch Vigreaux column. The data from a run with m-cresol are given in Table I.

*Table I*

FRACTIONATION OF PHOSPHORYLATION PRODUCT FROM THE REACTION OF m-CRESOL WITH PHOSPHORYL CHLORIDE

| Cut | Boiling Point | | Distillation Data, Compn. of Distillate | Weight | | Conversion (Percent, on Cresol) | Material Balance | | Recovery, Percent | |
|---|---|---|---|---|---|---|---|---|---|---|
| | ° C. | Mm. | | Grams | Moles | | P | Cresol | P | Cresol |
| 1 | 55–58 | 105 | POCl$_3$ | 256 | 1.68 | | 1.68 | | | |
| 2 | 90–97 | 1.0 | ArOPOCl$_2$* | 413 | 1.83 | 91.5 | 1.83 | 1.83 | | |
| 3 | 160–164 | 1.0 | (ArO)$_2$POCl | 19.5 | 0.066 | 3.3 | 0.066 | 0.13 | | |
| Traps | | | POCl$_3$ | 45.0 | 0.294 | | 0.294 | | | |
| Pot Residue | | | (ArO)$_3$PO | 7.5 | 0.02 | 1.0 | 0.02 | 0.06 | | |
| Total | | | | | | | 3.89 | 2.02 | 97.2 | 101 |

*Ar=m-tolyl.

EXAMPLES II–VIII

Following the general procedure of Example I, a series of phosphorylations was carried out with phenol, m-cresol, p-cresol, 3,5-dimethylphenol, p-chlorophenol, and 4-chloro-3-methyl phenol, using one mole percent of aluminum chloride (based on the phenol) as the catalyst. In each run the phosphoryl chloride and the catalyst were heated to 90–100° C. and the phenol was then introduced over 0.5 hour with the temperature being allowed to rise as rapidly as possible to 105° C. Table II summarizes the data obtained in these runs.

Table II
EFFECT OF PHOSPHORYL CHLORIDE:PHENOL RATIO ON THE CONVERSION OF PHENOL TO MONOARYLPHOSPHORODICHLORIDATE

| Phenol | Ratio, $POCl_3$/Phenol | Boiling Points | | | | Conversion Mole Percent Phenol to $ArOPOCl_2$* |
|---|---|---|---|---|---|---|
| | | $ArOPOCl_3$* | | $(ArO)_2POCl$* | | |
| | | C. | Mm. | C. | Mm. | |
| Phenol | 1.2 | 99.5–101.5 | 5 | | | 75.8 |
| m-Cresol | 1.2 | { 124.5–125.5 | 10 | 173 | 1.7 } | 77.7 |
| | | { 89–91 | 1 | 160–163 | 1 } | |
| m-Cresol | 2.0 | | | | | 89.2 |
| p-Cresol | 2.0 | 90–91 | 1 | 166–170 | 1.25 | 85.5 |
| 3,5-Dimethyl phenol | 2.0 | 82–83 | 0.5 | 162–163 | 0.6 | 86.0 |
| p-Chlorophenol | 2.0 | 96–104 | 1–1.5 | | | 75.4 |
| 4-Chloro-3-methyl phenol | 2.0 | 79–82 | 0.0 | 155–157 | 0.1 | 83.4 |

*Ar=aryl.

EXAMPLE IX

Charged to an autoclave were 104.9 parts of phosphoryl chloride and 1.0 part of aluminum chloride. To this mixture was added 40.7 parts of a commercially-available cresylic acid (neutral equivalent: 119) over a period of 45 minutes during which the temperature was held at 88 to 95° C. After this, the reaction mixture was cooked for 30 minutes at the same temperatures. Then, excess phosphoryl chloride and HCl were stripped off at pressure less than 50 millimeters of mercury and at a maximum temperature of 160° C. Formed was a high yield of a mixture of phenyl, cresyl and xylyl phosphorodichloridates.

EXAMPLE X

To a reaction vessel containing 306.7 parts (2 moles) of phosphoryl chloride was added 0.54 part of aluminum turnings and the mixture heated to 100° C. for one hour. Then 110 parts of cresol was fed into the vessel over a period of 45 minutes at 95 to 100° C. After cooking the reaction mixture for 30 minutes at 90–100° C., residual hydrogen chloride and phosphoryl chloride were removed by heating the product to 150° C. at 50 millimeters pressure. The remaining product was found to contain 91.2 percent of cresyl phosphorodichloridate in a yield of 89 percent.

As shown by the above examples, the process of this invention utilizes with great success monohydric phenols containing up to about 8 carbon atoms and up to 1 chloride atom attached to the ring. Illustrative of these are phenol, o-, m- and p-cresol, the various xylenols and ethylphenols, and the ring monochlorinated derivatives of these phenolic compounds. Commercially available mixtures of these phenolic compounds or mixtures of unchlorinated and monochlorinated phenols can also be used. The process of this invention has also been applied successfully to the preparation of o-nitrophenyl phosphorodichloridate with some sacrifice in yield.

Instead of phosphoryl chloride, recourse may be had to phosphoryl bromide, phosphoryl iodide, phosphoryl bromochlorides or mixtures of these materials. Phosphoryl chloride is preferred because of its high reactivity, availability and relatively low cost. It is preferable to conduct the process of this invention under substantially anhydrous conditions. For example, experiments carried out with various quantities of added water indicated that the reaction proceeds at a satisfactory rate if the water:aluminum chloride weight ratio does not exceed 0.2. At a weight ratio of about 0.28, the catalyst was rendered inactive unless additional catalyst was added. Therefore, even if water is introduced inadvertently into the reaction system—e.g., by means of a poor grade of phenol—the reaction will proceed very readily provided additional catalyst is used. However, this is undesirable because of the additional operation required and the consequent increase in cost. On the other hand, the process of this invention proceeds very readily when using commercially-available reactants of normal purity.

Catalytic quantities of aluminum chloride or aluminum metal which has been refluxed with phosphoryl chloride for at least 0.5 hour (i.e., 0.5 to about 3 hours) are used in the process of this invention. In the case of aluminum chloride, the preferred amounts range from about 0.25 to about 3 mole percent based on the phenol introduced into the reaction zone. When the refluxed aluminum metal is used—aluminum turnings or chips are excellent for this purpose—the amount ranges from about 0.003 to about 0.5 percent by weight based on the weight of the phenol used. Thus, generally speaking, when using the catalysts of this invention, there should be present from about 0.005 to about 0.9 weight percent of aluminum based on the weight of the phenol, the aluminum being in the form of either aluminum chloride or aluminum metal refluxed with phosphoryl chloride as described above.

The following example illustrates a preferred manner by which a typical phenyl phosphorodichloridate is used as a chemical intermediate in the synthesis of a phenyl dimethyl phosphate.

EXAMPLE XI

One-half mole (112.5 parts) of distilled m-tolyl phosphorodichloridate prepared by the procedure of Example I is fed over 50 minutes at 20° C. to 96 parts (3 moles) of methanol with constant stirring and external cooling. After cooking the reaction mixture for 75 minutes at 30° C., the reaction product is quenched in 300 parts of water, extracted with 55 parts of a 10 percent sodium hydroxide–10 percent sodium chloride solution, washed twice with 50-part quantities of 5 percent sodium chloride solution, freed of water under reduced pressure, filtered and weighed. Distillation of the organic product yields very pure m-tolyl diphenyl phosphate which comes off at 114° C. at one millimeter of mercury pressure. Analysis of this phosphate shows it to correspond very closely to the theoretical values of 50.0 percent of carbon, 6.02 percent of hydrogen and 14.35 percent of phosphorus. It has a refractive index of $n_D^{20}$ 1.4910.

The pre-eminence of the phenyl dimethyl phosphates as ignition control compounds was demonstrated by carrying out a series of fleet tests. Used were various modern automobiles equipped with 11:1 compression ratio engines. The cars were operated under standard driving conditions on a commercially-available gasoline containing 3 milliliters of tetraethyllead per gallon as standard Motor Mix (0.5 theory of bromine as ethylene dibromide and 1.0 theory of chlorine as ethylene dichloride) with which had been blended 1.04 milliliters per gallon of a mixture of tolyl dimethyl phosphate and xylyl dimethyl phosphate (mixed isomers in each instance). It was found that the spark plug life when using this treated fuel as measured by miles required to reach three spark failures per car was ten times as long as the spark plug life afforded by the same tests using the corresponding phosphate-free gasoline.

What is claimed is:

1. A process for preparing phenyl phosphorodichloridates characterized by introducing a monohydric phenol, containing up to about 8 carbon atoms and up to one chlorine atom attached to the ring, said phenol being selected from the group consisting of phenol, the cresols, the xylenols, the ethyl phenols and the ring monochlorinated derivatives thereof, in incremental portions into a mixture comprising phosphoryl chloride in a mole ratio of from about one to about two moles of chloride per mole of the phenol, and, as a catalyst, from about 0.005 to about 0.9 weight percent of aluminum, based on the weight of the phenol, in a form selected from the group consisting of aluminum chloride and aluminum metal refluxed with phosphoryl chloride for at least 0.5 hour, maintaining the temperature of the reaction mixture between about 85 and about 110° C. until at least about one-half of the phenol has been introduced, and thereafter maintaining the temperature between about 85 to about 130° C. until the reaction is completed, said entire process being carried out under substantially anhydrous conditions, the time elapsed from the commencement of the introduction of said phenol into said mixture to the end of the reaction being no more than about 1.25 hours.

2. The process of claim 1 wherein said catalyst is aluminum chloride, and the water:aluminum chloride weight ratio is not in excess of 0.2.

3. The process of claim 1 wherein said catalyst is aluminum metal refluxed with phosphoryl chloride for at least 0.5 hour.

4. The process of claim 1 in which said phenol is phenol.

5. The process of claim 1 in which said phenol is a cresol.

6. The process of claim 1 in which said phenol is a xylenol.

7. The process of claim 1 wherein said phenol is p-chlorophenol.

References Cited in the file of this patent
UNITED STATES PATENTS

| | | |
|---|---|---|
| 2,225,285 | Moyle | Dec. 17, 1940 |
| 2,636,876 | Zenftman et al. | Apr. 28, 1953 |
| 2,938,048 | Odenweller et al. | May 24, 1960 |